(12) United States Patent
Lu

(10) Patent No.: US 10,686,324 B2
(45) Date of Patent: Jun. 16, 2020

(54) ELECTRONIC APPARATUS AND CHARGING METHOD THEREOF

(71) Applicant: Shih-Chin Lu, Taipei (TW)

(72) Inventor: Shih-Chin Lu, Taipei (TW)

(73) Assignee: COMPAL ELECTRONICS, INC., Taipei (TW)

( * ) Notice: Subject to any disclaimer, the term of this patent is extended or adjusted under 35 U.S.C. 154(b) by 399 days.

(21) Appl. No.: 15/806,324

(22) Filed: Nov. 8, 2017

(65) Prior Publication Data

US 2019/0058346 A1 Feb. 21, 2019

(30) Foreign Application Priority Data

Aug. 21, 2017 (TW) .............................. 106128316 A

(51) Int. Cl.
*H02J 7/00* (2006.01)
*H02J 7/34* (2006.01)

(52) U.S. Cl.
CPC .......... *H02J 7/007184* (2020.01); *H02J 7/34* (2013.01)

(58) Field of Classification Search
CPC .............................. H02J 7/007184; H02J 7/34
USPC .................................................. 320/164, 137
See application file for complete search history.

(56) References Cited

U.S. PATENT DOCUMENTS

| 7,502,240 | B2* | 3/2009 | Leung | ............... | H02M 3/33515 |
| | | | | | 307/40 |
| 7,518,894 | B2* | 4/2009 | Fosler | ....................... | H02J 1/08 |
| | | | | | 363/72 |
| 8,041,422 | B2* | 10/2011 | Honda | ............... | A61B 1/00032 |
| | | | | | 604/20 |
| 8,089,973 | B2* | 1/2012 | Faska | .................... | H04L 49/351 |
| | | | | | 361/600 |
| 9,389,617 | B2* | 7/2016 | Dally | ..................... | H02M 3/158 |
| 9,774,820 | B2* | 9/2017 | Yang | ....................... | H04N 5/765 |
| 10,289,139 | B1* | 5/2019 | Chung | .................... | H03H 11/04 |
| 2014/0106683 | A1* | 4/2014 | Oreyang | ........... | H04M 1/72527 |
| | | | | | 455/74.1 |
| 2016/0370835 | A1* | 12/2016 | Erickson | ................... | H02J 7/00 |

* cited by examiner

*Primary Examiner* — M Baye Diao
(74) *Attorney, Agent, or Firm* — JCIPRNET

(57) ABSTRACT

An electronic apparatus and a charging method thereof are provided. The electronic apparatus includes a transmission port, a battery module, an apparatus circuit, a power conversion circuit, a switching circuit, and a control circuit. The transmission port is coupled to an external power apparatus to receive an input power. The apparatus circuit and the battery module are connected to each other in parallel and are coupled to a power bus. Each of the power conversion circuit and the switching circuit is coupled between the transmission port and the power bus. When the external power apparatus is a programmable power supplier and a battery voltage is lower than a reference voltage, the control circuit disables the power conversion circuit, enables the switching circuit to transmit the input power to the power bus, and regulates a voltage value and a current value of the input power dynamically.

19 Claims, 5 Drawing Sheets

ELECTRONIC APPARATUS AND CHARGING METHOD THEREOF

CROSS-REFERENCE TO RELATED APPLICATION

This application claims the priority benefit of Taiwan application serial no. 106128316, filed on Aug. 21, 2017. The entirety of the above-mentioned patent application is hereby incorporated by reference herein and made a part of this specification.

BACKGROUND OF THE INVENTION

1. Field of the Invention

The invention is related to a charging method, and particularly related to a charging method that may regulate a charging current and a charging voltage dynamically and an electronic apparatus using the charging method.

2. Description of Related Art

Nowadays, there are two common methods of supplying power to an electronic apparatus. In one way the power is provided by a battery of the electronic apparatus, and in the other way an external power supplier serves to provide the power to the electronic apparatus or charge the battery inside the electronic apparatus. When the external power supplier provides the power to the electronic apparatus or charges the battery inside the electronic apparatus, the charging circuit inside the electronic apparatus may perform power conversion to the input power provided by the power supplier according to the specifications and features of the battery, so as to regulate the charging voltage and the charging current for charging the battery. However, when the power conversion is performed, the charging circuit consumes power and thus generates heat, which is especially evident on a light and compact electronic apparatus.

Besides, when an external power supplier charges the battery in the electronic apparatus and provides power to a system load in the electronic apparatus, the output voltage provided by the power supplier is usually limited to a constant voltage specification value of the battery. In this case, although the overly high terminal voltage of the battery may be avoided, the output power of the power supplier is limited too. Once the system load in the electronic apparatus has a greater power demand due to the operation, the output power of the power supplier may be insufficient to simultaneously meet the requirements of charging the battery and supplying power to the system load. As such, the battery needs to be converted from the charging mode to the discharging mode to support the power demand of the system load; thereby, the battery cannot be effectively charged, and the electric quantity of the battery is reduced. Accordingly, it is important for those skilled in the art to solve the heat problem generated during the battery charging and to solve the problem of the limited output power of the power supplier insufficient to simultaneously meet the requirements of charging the battery and supplying power to the system load.

SUMMARY OF THE INVENTION

The invention is directed to an electronic apparatus and a charging method thereof, in which a power consumption caused by charging a battery module of the electronic apparatus may be lowered, and the issue that the requirements for charging the battery module and supplying power to the electronic apparatus may not be simultaneously met due to the limitation to an output power of a power supplier may be avoided.

In an embodiment of the invention, an electronic apparatus includes a transmission port, a battery module, an apparatus circuit, a power conversion circuit, a switching circuit, and a control circuit. The transmission port is configured to be coupled to an external power apparatus to receive an input power. The battery module is coupled to a power bus. The apparatus circuit is connected to the battery module in parallel and coupled to the power bus. The power conversion circuit is coupled between the transmission port and the power bus and configured to convert the input power, so as to provide a charging power to the power bus. The switching circuit is coupled between the transmission port and the power bus and configured to transmit the input power as the charging power to the power bus. The control circuit is coupled to the transmission port to communicate with the external power apparatus and to detect a battery voltage of the battery module. When the control circuit determines that the external power apparatus is a programmable power supplier and detects that the battery voltage is lower than a reference voltage, the control circuit disables the power conversion circuit, turns on the switching circuit, and regulates a set value of the external power apparatus to regulate a voltage value and a current value of the input power dynamically.

In an embodiment of the invention, a charging method of an electronic apparatus includes following steps. An input power is received by coupling a transmission port of the electronic apparatus to an external power apparatus. Whether the external power apparatus is a programmable power supplier is determined by a control circuit of the electronic apparatus communicating with the external power apparatus through the transmission port. Whether a battery voltage of a battery module of the electronic apparatus is lower than a reference voltage is detected and determined by the control circuit. If the external power apparatus is the programmable power supplier and the battery voltage is lower than the reference voltage, following steps are performing by the control circuit: disabling a power conversion circuit of the electronic apparatus, turning on a switching circuit of the electronic apparatus to transmit the input power to the battery module and an apparatus circuit of the electronic apparatus, and regulating a set value of the external power apparatus to dynamically regulate a voltage value and a current value of the input power, so as to charge the battery module and supply power to the apparatus circuit.

Based on the above descriptions, in the electronic apparatus and the charging method thereof as provided in the invention, if the external power apparatus is the programmable power supplier and the battery voltage is lower than the reference voltage, the control circuit may dynamically regulate the voltage value and the current value of the input power, so as to avoid the limitation to the output power of the external power apparatus. As such, not only the requirements for charging the battery module and supplying power to the apparatus circuit may be simultaneously satisfied, but also the battery module may be charged rapidly. Besides, the input power is transmitted to the power bus through the switching circuit in an on state, so as to serve as a charging power for charging the battery module and for supplying power to the apparatus circuit. Since the power consumption of the switching circuit in the one state is lower, and the power conversion circuit is in a disabled state, the overall power consumption of the electronic apparatus may be effectively reduced to solve a heat problem generated while the battery module is being charged.

Several exemplary embodiments accompanied with figures are described in detail below to further describe the disclosure in details.

BRIEF DESCRIPTION OF THE DRAWINGS

The accompanying drawings are included to provide a further understanding, and are incorporated in and constitute a part of this specification. The drawings illustrate exemplary embodiments and, together with the description, serve to explain the principles of the disclosure.

DESCRIPTION OF THE EMBODIMENTS

Figure 1:
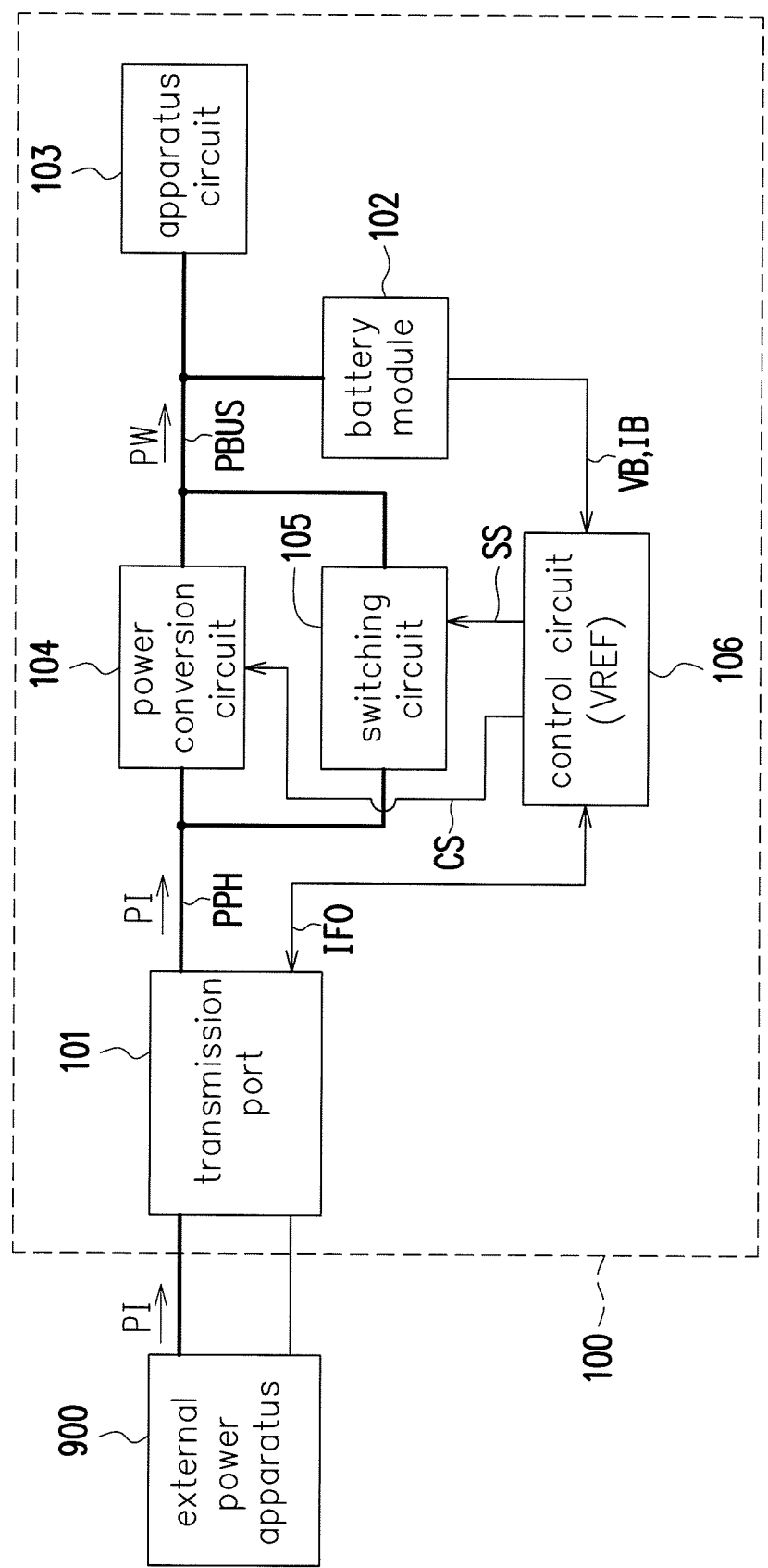
FIG. 1 is a schematic block view of an electronic apparatus illustrated according to an embodiment of the invention.

Reference will now be made in detail to the present embodiments of the invention, examples of which are illustrated in the accompanying drawings. Wherever possible, the same reference numbers are used in the drawings and the description to refer to the same or like parts.

Hereinafter, referring to FIG. 1, which is a schematic block view of an electronic apparatus illustrated according to an embodiment of the invention. An electronic apparatus 100 may include a transmission port 101, a battery module 102, an apparatus circuit 103, a power conversion circuit 104, a switching circuit 105, and a control circuit 106, but the invention is not limited thereto. The transmission port 101 is configured to be coupled to an external power apparatus 900 to receive an input power PI. The apparatus circuit 103 is connected to the battery module 102 in parallel and coupled to a power bus PBUS. The power conversion circuit 104 is coupled between the transmission port 101 and the power bus PBUS. The power conversion circuit 104 is controlled by a control signal CS to convert the input power PI so as to provide a charging power PW to the power bus PBUS. The switching circuit 105 is coupled between the transmission port 101 and the power bus PBUS and may be used as a bypass path between the transmission port 101 and the power bus PBUS. The switching circuit 105 may be controlled by a switching signal SS and transmits the input power PI to the power bus PBUS, so as to serve as the charging power PW.

The control circuit 106 is coupled to the transmission port 101, the battery module 102, the power conversion circuit 104, and the switching circuit 105. The control circuit 106 may communicate with the external power apparatus 900 through the transmission port 101 and determine whether the external power apparatus 900 is a programmable power supplier, wherein an output voltage and an output current of the programmable power supplier are regulatable and may conform to the USB 3.1 power delivery specification, which should however not be construed as a limitation to the invention. Apart from that, the control circuit 106 may detect a battery voltage VB of the battery module 102 and determine whether the battery voltage VB is lower than a reference voltage VREF, wherein the reference voltage VREF may be determined according to practical applications or design requirements. Generally, if the battery voltage VB is lower than the reference voltage VREF, it may indicate that the battery module 102 is not fully charged.

When the control circuit 106 determines that the external power apparatus 900 is the programmable power supplier and determines that the battery voltage VB is lower than the reference voltage VREF, the control circuit 106 enters a fast charging mode. In the fast charging mode, the control circuit 106 generates the control signal CS to disable the power conversion circuit 104 and generate the switching signal SS to turn on the switching circuit 105, and the control circuit 106 may dynamically regulate a set value of the external power apparatus 900 to dynamically regulate the voltage value and the current value of the input power PI.

It is understood that in the fast charging mode, the control circuit 106 may dynamically regulate the voltage value and the current value of the input power PI to avoid an output power of the external power apparatus 900 from being limited. As such, not only the requirements for charging the battery module 102 and for supplying power to the apparatus circuit 103 may be simultaneously fulfilled, but also the battery module 102 may be charged rapidly. Besides, in the fast charging mode, the input power PI is transmitted to the power bus PBUS through the switching circuit 105 in an on state to serve as the charging power PW for charging the battery module 102 and for supplying power to the apparatus circuit 103. Since the power consumption is lower when the switching circuit 105 is in the on state, and the power conversion circuit 104 is in a disabled state, the overall power consumption of the electronic apparatus 100 may be effectively reduced to solve a heat problem generated while the battery module 102 is being charged.

In an embodiment of the invention, the electronic apparatus 100 may further include an input switching circuit (not illustrated). The input switching circuit may be disposed on a power transmission path PPH among the transmission port 101, the power conversion circuit 104, and the switching circuit 105. When the control circuit 106 detects through the transmission port 101 that the external power apparatus 900 is plugged into the transmission port 101, the control circuit 106 may turn on the input switching circuit, so that the input switching circuit may transmit the input power PI to the power conversion circuit 104 and the switching circuit 105. By contrast, when the control circuit 106 does not detect through the transmission port 101 that the external power apparatus 900 is plugged into the transmission port 101, the control circuit 106 may turn off the input switching circuit.

In an embodiment of the invention, the electronic apparatus 100 may further include a current detecting circuit (not illustrated). The current detecting circuit may be disposed on the power transmission path PPH among the transmission port 101, the power conversion circuit 104, and the switching circuit 105. The current detecting circuit may detect the current value of the input power PI and generate a detecting result to the control circuit 106 accordingly. The control circuit 106 may regulate a set value of the external power apparatus 900 according to the above detecting result and thus regulate the voltage value and the current value of the input power PI. Detailed explanation will be provided hereinafter.

In an embodiment of the invention, the electronic device 100 may be electrical equipment supporting the USB 3.1 power delivery specification, such as a notebook computer, a tablet computer, a personal digital assistant, a smart phone, a digital music player, etc., while the apparatus circuit 103 may be, for example, an apparatus circuit in the above-mentioned notebook computer, tablet computer, personal digital assistant, smart phone, or digital music player, but the invention is not limited thereto. In an embodiment of the invention, the transmission port 101 may be, for example, a Type-C USB port, a Mini USB port, a Micro USB port, a transformer power port, or the like, but the invention is not limited thereto.

In an embodiment of the invention, the battery module 102 may be a single battery (or a battery element) or a module including a plurality of batteries (or battery elements). Besides, the battery module 102 may be a chargeable battery module, such as a nickel-zinc battery, a nickel-metal hydride battery, a lithium-ion battery, a lithium polymer battery, a lithium iron phosphate, or the like, but the invention is not limited thereto.

In an embodiment of the invention, the power conversion circuit 104 may be a DC to DC conversion circuit (such as a boosted circuit or a buck circuit), but the invention is not limited thereto. The power conversion circuit 104 may vary according to practical applications or design requirements. In an embodiment of the invention, the switching circuit 105 may be implemented in form of a power transistor, but the invention is not limited thereto.

In an embodiment of the invention, the control circuit 106 may be hardware, firmware, or software or machine executable programming code stored in a memory and loaded and executed by a microprocessor or a digital signal processor. If implemented in form of the hardware, the control circuit 106 may be implemented by one single integrated circuit chip or a plurality of circuit chips, but the invention is not limited thereto. The circuit chips or the single integrated circuit chip mentioned above may be implemented in form of an application specific integrated circuit (ASIC) or a field programmable gate array (FPGA), and the above memory may be, for example, a random access memory, a read-only memory, a flash memory, or the like.

Figure 2:
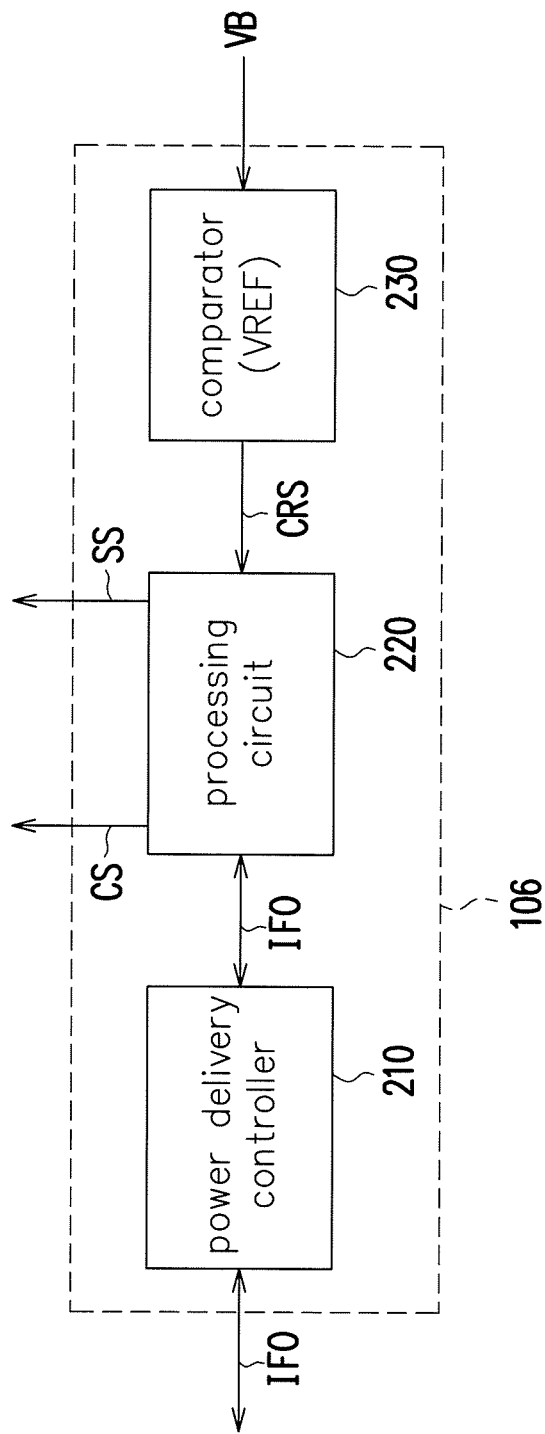
FIG. 2 is a schematic block view of a control circuit of an electronic apparatus illustrated according to an embodiment of the invention.

In another embodiment of the invention, as illustrated in FIG. 2, the control circuit 106 may include a power delivery controller (or a PD controller) 210, a processing circuit 220, and a comparator 230. The power delivery controller 210 is coupled to the transmission port 101 to communicate with the external power apparatus 900, so as to receive information IFO of the external power apparatus 900. The comparator 230 is coupled to the battery module 102 to detect the battery voltage VB of the battery module 102 and compare the battery voltage VB with the reference voltage VREF to generate a comparison result CRS. The processing circuit 220 is an operation core of the control circuit 106. The processing circuit 220 is coupled between the power delivery controller 210 and the comparator 230 to receive the information IFO of the external power apparatus 900 and the comparison result CRS. The processing circuit 220 may determine whether the external power apparatus 900 is the programmable power supplier according to the information IFO, determine whether the battery voltage VB is lower than the reference voltage VREF according to the comparison result CRS, and thereby control the operation of the power conversion circuit 104 and the switching circuit 105 and to regulate the set value of the external power apparatus 900 through the power delivery controller 210.

In an embodiment of the invention, the power delivery controller 210 may be implemented in form of an existing USB power delivery controller, and the processing circuit 220 may be implemented in form of the micro-controller, but the invention is not limited thereto.

Hereafter, a charging method of an electronic apparatus will be further described with reference to the flowchart of FIG. 3 according to the present embodiment. Here, FIG. 3 is a flowchart of a charging method of an electronic apparatus illustrated according to an embodiment of the invention.

Figure 3:
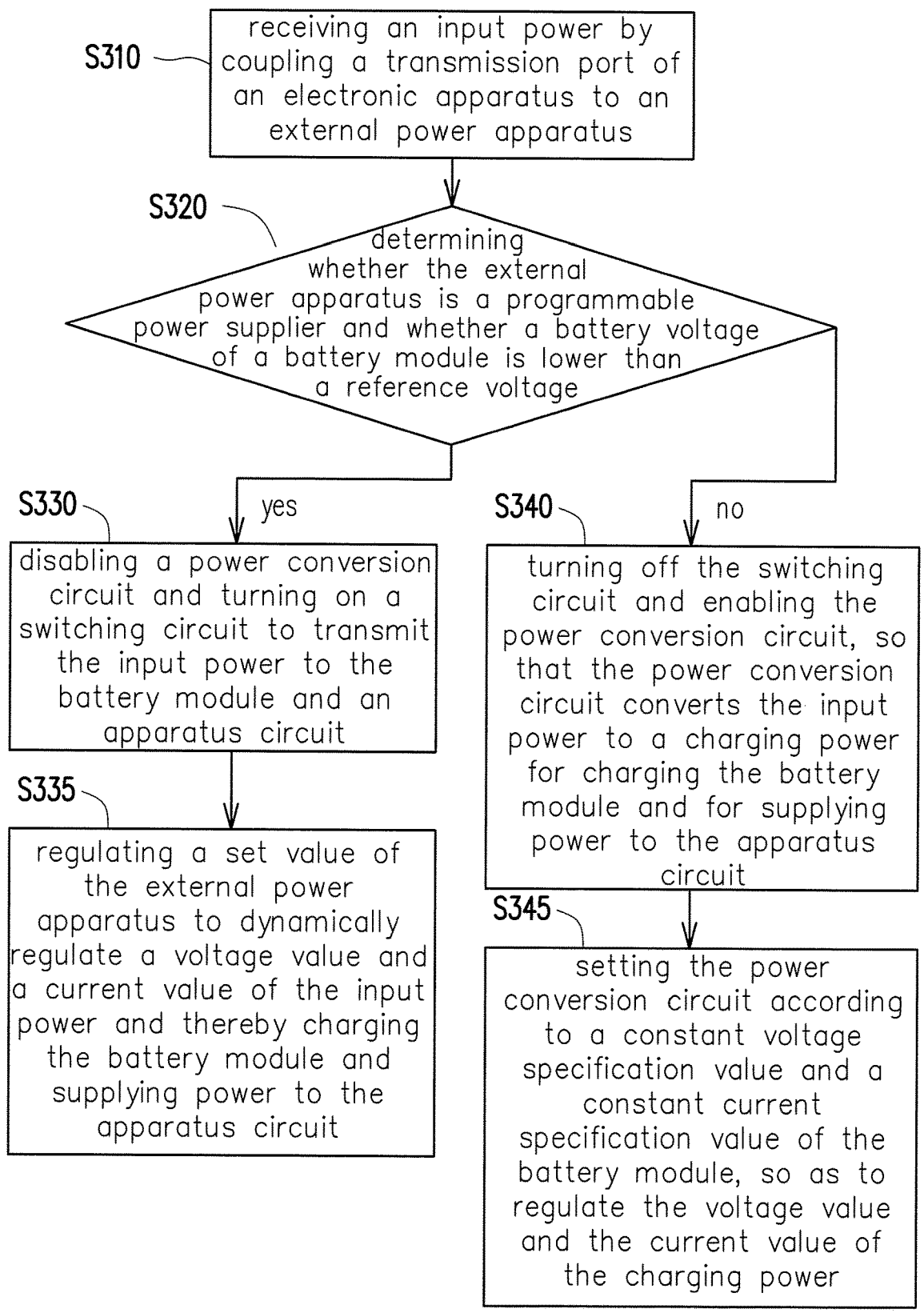
FIG. 3 is a flowchart of a charging method of an electronic apparatus illustrated according to an embodiment of the invention.

Referring to FIG. 1 and FIG. 3 together, in the charging method of the electronic apparatus provided in the embodiment of the invention. First, the input power PI may be received by coupling the transmission port 101 of the electronic apparatus 100 to the external power apparatus 900, as illustrated in step S310. Afterwards, it is determined whether the external power apparatus 900 is the programmable power supplier by the control circuit 106 communicating with the external power apparatus 900 through the transmission port 101, and the control circuit 106 may detect and determine whether the battery voltage VB of the battery module 102 is lower than the reference voltage VREF, as illustrated in step S320.

If the determining result of step S320 is "no", i.e., the external power apparatus 900 may not be the programmable power supplier, or if the battery voltage VB is higher than or equal to the reference voltage VREF, step S340 is performed, wherein the control circuit 106 enters a normal charging mode. In step S340, the control circuit 106 turns off the switching circuit 105 and enables the power conversion circuit 104, so that the power conversion circuit 104 converts the input power PI to the charging power PW for charging the battery module 102 and for supplying power to the apparatus circuit 103. Afterwards, in step S345, the power conversion circuit 104 may be set by the control circuit 106 according to a constant voltage specification value and a constant current specification value of the battery module 102, so as to regulate the voltage value and the current value of the charging power PW. In detail, if the external power apparatus 900 is not the programmable power supplier, the voltage value and the current value of the input power PI are indicated to be irregulatable, and thus the charging power PW required for charging the battery module 102 is generated by the power conversion circuit 104 which converts the input power PI. In addition, if the battery voltage VB is higher than or equal to the reference voltage VREF, it is indicated that the battery module 102 is about to be fully charged, and thus the voltage of the battery module 102 needs to be precisely controlled to avoid over voltage of the battery module 120. In general, a voltage control precision of the external power apparatus 900 is usually lower than that of the power conversion circuit 104, and thus under the condition that the battery module 102 is about to be fully charged, the power conversion circuit 104 may be used to convert the input power PI to precisely control the voltage value of the charging power PW.

On the other hand, if the determining result of step S320 is "yes", the control circuit 106 enters the fast charging mode. In step S330, the following steps are performed by the control circuit 106: disabling the power conversion circuit 104 and turning on the switching circuit 105 to transmit the input power PI to the battery module 102 and the apparatus circuit 103. Afterwards, in step S335, the set value of the external power apparatus 900 may be regulated by the control circuit 106 so as to dynamically regulate a voltage value and a current value of the input power PI and thus charge the battery module 102 and supply power to the apparatus circuit 103. The details of the steps S310-S330 may be referred to as relevant descriptions depicted in FIG. 1 and are herein omitted. The details of the step S335 are described hereinafter.

Figure 4:
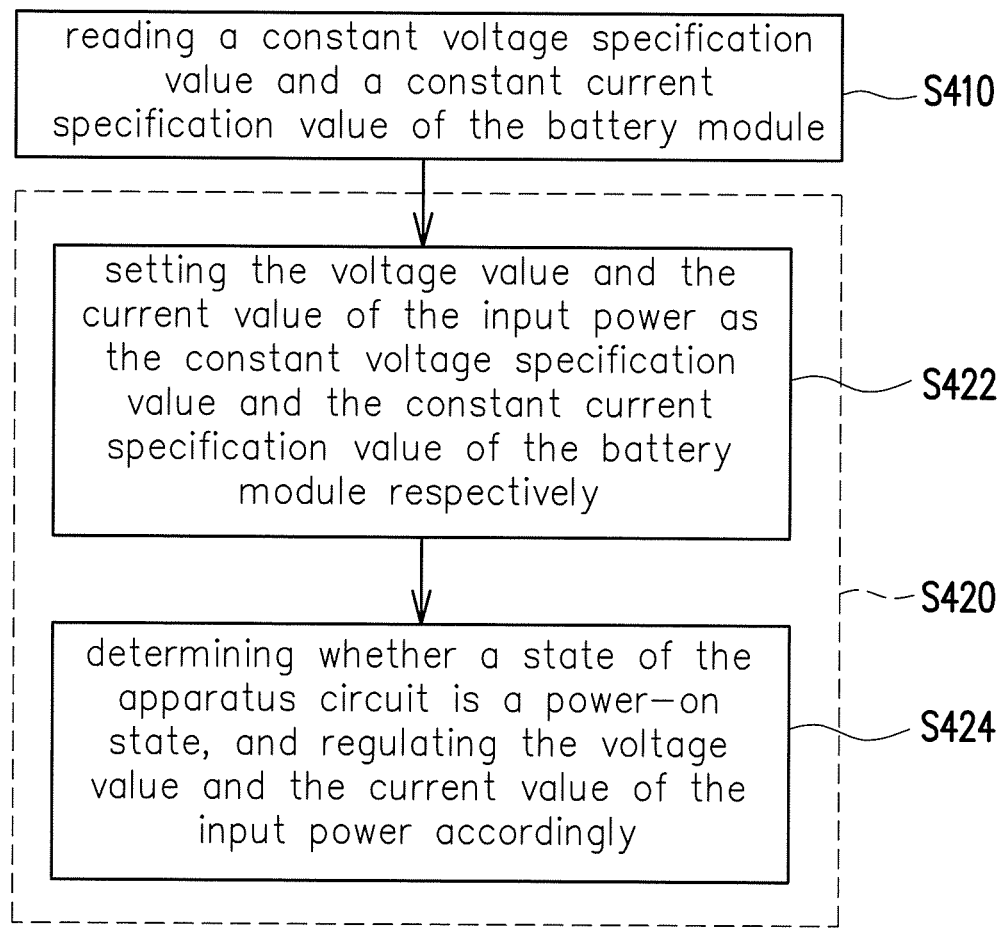
FIG. 4 illustrates details of the step S335 of FIG. 3.

Please refer to FIG. 1, FIG. 3 and FIG. 4 together. FIG. 4 illustrates details of the step S335 of FIG. 3, and the details are described below. In step S410, a constant voltage specification value and a constant current specification value of the battery module 120 may be read by the control circuit 106, wherein the constant voltage specification value of the battery module 102 is associated with the number of batteries in the battery module 102. For example, if the battery module 102 includes five batteries connected in series, and the constant voltage specification value of each battery is 4.2 V, the constant voltage specification value of the battery module 102 is 21 V. Afterwards, in step S420, the set value of the external power apparatus 900 may be regulated by the control circuit 106 according to the constant voltage specification value and the constant current specification value of the battery module 102 as well as the state of the apparatus circuit 103, so as to dynamically regulate the voltage value and the current value of the input power PI. The details of step S420 are described below. In step S422, the voltage value and the current value of the input power PI may be set by the control circuit 106 as the constant voltage specification value and the constant current specification value of the battery module 102, respectively. Afterwards, in step S424, the control circuit 106 determines whether the state of the apparatus circuit 103 is a power-on state and accordingly regulates the voltage value and the current value of the input power PI.

Figure 5:
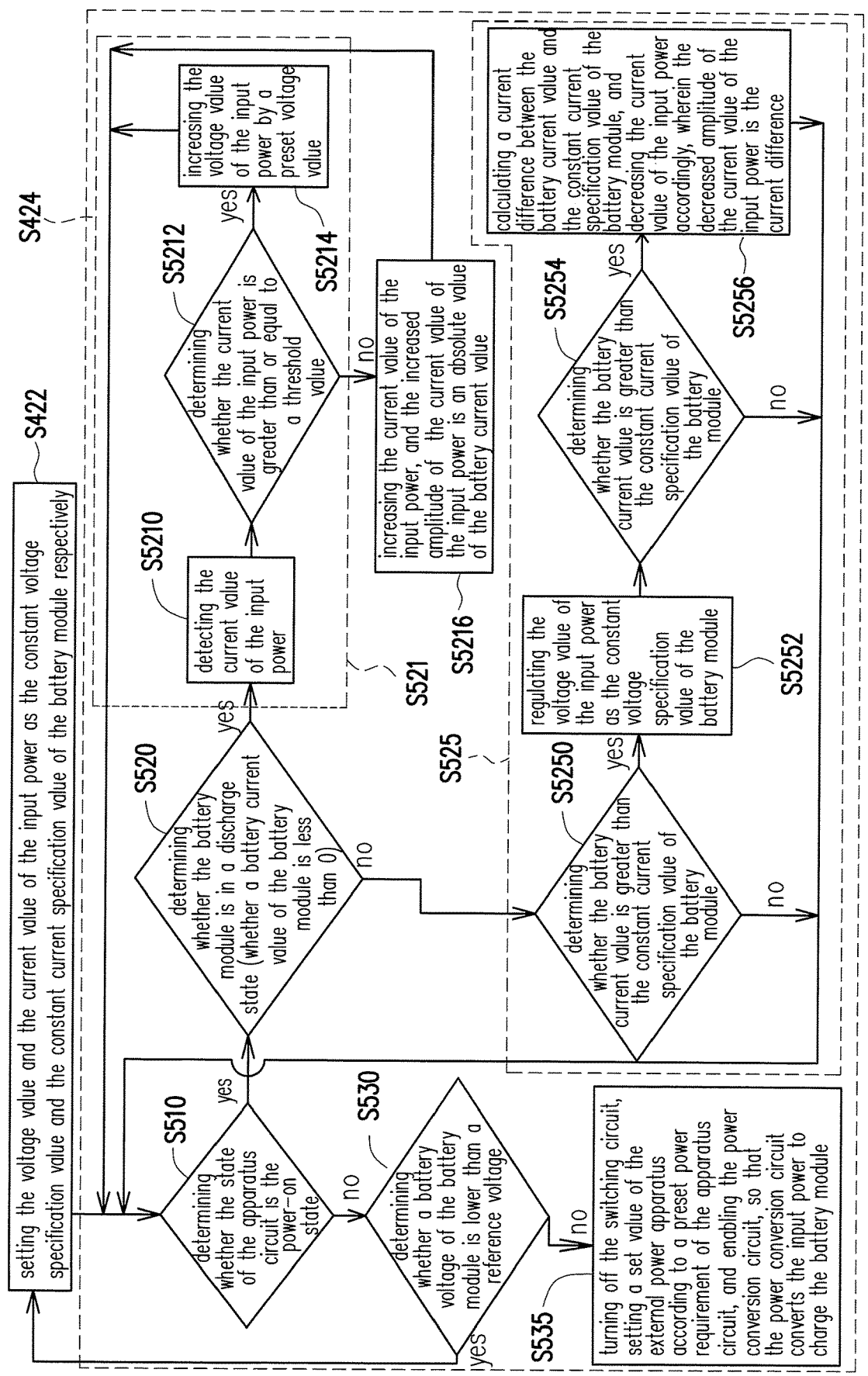
FIG. 5 illustrates details of the step S424 of FIG. 4.

Please refer to FIG. 1, FIG. 4 and FIG. 5 together. FIG. 5 illustrates details of the step S424 of FIG. 4, and the details are described hereinafter. As illustrated in step S510, the control circuit 106 may determine whether the state of the apparatus circuit 103 is the power-on state. If the determining result of the step S510 is "yes", i.e., the state of the apparatus circuit 103 is the power-on state, the control circuit 106 may detect a battery current value IB of the battery module 102 to determine the state of the battery module 102. In detail, the control circuit 106 may determine whether the battery module 102 is in a discharge state according to the battery current value IB, as illustrated in the step S520. If the battery current value IB is less than 0, it means that the battery module 102 is in the discharge state, but the invention not limited thereto. Afterwards, the control circuit 106 may regulate the voltage value and the current value of the input power PI according to the state of the battery module 102.

In detail, if the determining result of the step S520 is "yes", that is, if the battery module 102 is in the discharge state (i.e., if the battery current value IB is less than 0), it means that the apparatus circuit 103 has high power demand. Accordingly, the output power of the external power apparatus 900 is insufficient to simultaneously meet the requirements of charging the battery module 102 and supplying power to the apparatus circuit 103, so that the battery module 102 enters the discharging mode to support the power demand of the apparatus circuit 103. Therefore, the control circuit 106 may regulate the set value of the external power apparatus 900 to increase at least one of the voltage value and the current value of the input power PI, so as to increase the power of the input power PI, as illustrated in step S521. Afterwards, go back to step S510 to again determine whether the state of the apparatus circuit 103 is the power-on state.

The details of the step S521 are described below. First, in step S5210, the current value of the input power PI may be detected. For example, the current value of the input power PI may be detected by the above-mentioned current detecting circuit. Afterwards, in step S5212, the current value of the input power PI may be compared with a threshold value ITH to determine whether the current value of the input power PI is greater than or equal to the threshold value ITH. The threshold value ITH may be, for example, the maximum current value according to the USB 3.1 power delivery specification or the maximum current value that can be provided by the external power apparatus 900, but the invention is not limited thereto. If the determining result of the step S5212 is "yes", it indicates that the current value of the input power PI has reached the maximum value, and thus the control circuit may increase the voltage value of the input power PI by a preset voltage value, resulting in an increase of the power of the input power PI, as described in the step S5214 and the following equation (1), wherein VPI' represents the increased voltage value of the input power PI, VPI represents the voltage value of the input power PI before the increase, and VDF represents the preset voltage value. Afterwards, go back to the step S510 to again determine whether the state of the apparatus circuit 103 is the power-on state.

$$VPI'=VPI+VDF \qquad \text{equation (1)}$$

If the determining result of the step S5212 is "no", the control circuit may increase the current value of the input power PI, and the increased amplitude is an absolute value of the battery current value IB, leading to an increase in the power of the input power PI, as described in step S5216 and the following equation (2), wherein IPI' represents the increased current value of the input power PI, and IPI represents the current value of the input power PI before the increase. Afterwards, go back to step S510 to determine whether the state of the apparatus circuit 103 is the power-on state.

$$IPI'=IPI+|IB| \qquad \text{equation(2)}$$

On the other hand, if the determining result of the step S520 is "no", that is, if the battery module 102 is not in the discharge state (i.e., the battery current value IB is greater than or equal to 0), it indicates that the apparatus circuit 103 has insignificant power demand, and that the output power of the external power apparatus 900 may be sufficient to meet the requirements of charging the battery module 102 and supplying power to the apparatus circuit 103. Therefore, the control circuit 106 may determine whether to regulate the voltage value or the current value of the input power PI according to a relation between the battery current value IB and the constant current specification value of the battery module 102, as described in step S525.

The details of step S525 are described below. First, in step S5250, whether the battery current value IB is greater than the constant current specification value of the battery module 102 is determined. If the determining result of step S5250 is "no", go back to step S510 to again determine whether the state of the apparatus circuit 103 is the power-on state. If the determining result of step S5250 is "yes", it indicates that the battery module 102 is in the charging state, and that the output power of the external power apparatus 900 exceeds the requirement of charging the battery module 102, and thus the control circuit 106 may reduce the power of the input power PI. First, in step S5252, the control circuit 106 may regulate the voltage value of the input power PI to be the constant voltage specification value of the battery module 102, so as to regulate the output power of the external power apparatus 900. Afterwards, the control circuit 106 may detect again whether the battery current value IB is still greater than the constant current specification value of the battery module 102, as described in step S5254. If the determining result of step S5254 is "no", go back to step S510 to again determine whether the state of the apparatus circuit 103 is the power-on state. If the determining result of step S5254 is "yes", it indicates that the output power of the external power apparatus 900 still exceeds the requirement of charging the battery module 102. Thus, the control circuit 106 may calculate the current difference between the battery current value IB and the constant current specification value of the battery module 102 and decrease the current value of the input power PI accordingly, wherein the decreased amplitude of the current value of the input power PI is the current difference, as described in step S5256. After step S5256 is performed, go back to step S510 to again determine whether the state of the apparatus circuit 103 is the power-on state.

On the other hand, if the determining result of the step S510 is "no", that is, if the state of the apparatus circuit 103 is a power-off state, the control circuit 106 may detect whether the battery voltage VB of the battery module 102 is lower than the reference voltage VREF, as described in step S530. If the determining result of step S530 is "yes", it indicates that the battery module 102 is not fully charged, so go back to step S422, in which the voltage value and the current value of the input power PI may be set by the control circuit 106 as the constant voltage specification value and the constant current specification value of the battery module 102, respectively, so as to rapidly charge the battery module 102, i.e., the control circuit 106 enters the fast charging mode. If the determining result of step S530 is "no", the step S535 is performed, and the control circuit 106 terminates the fast charging mode. In step S535, the control circuit 106 turns off the switching circuit 105, sets the set value of the external power apparatus 900 according to a preset power requirement of the apparatus circuit 103, and enables the power conversion circuit 104, so that the power conversion circuit 104 may convert the input power PI to charge the battery module 102. Here, the preset power requirement of the apparatus circuit 103 is determined according to practical applications or design requirements.

To sum up, in the electronic apparatus and the charging method thereof provided by the embodiments of the invention, in the fast charging mode, the control circuit may dynamically regulate the voltage value and the current value of the input power, so as to avoid limitations to the output power of the external power apparatus. As such, not only the requirements for charging the battery module and for supplying power to the apparatus circuit may be simultaneously fulfilled, but also the battery module may be charged rapidly. Besides, in the fast charging mode, the input power is transmitted to the power bus through the switching circuit in the on state and serves as the charging power for charging the battery module and for supplying power to the apparatus circuit. Since the power consumption is lower when the switching circuit is in the on state, and the power conversion circuit is in the disabled state, the overall power consumption of the electronic apparatus may be effectively reduced to solve the heat problem generated while the battery module is being charged.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. An electronic apparatus, comprising:
    a transmission port, configured to be coupled to an external power apparatus to receive an input power;
    a battery module, coupled to a power bus;
    an apparatus circuit, connected in parallel with the battery module and coupled to the power bus;
    a power conversion circuit, coupled between the transmission port and the power bus, and configured to convert the input power so as to provide a charging power to the power bus;
    a switching circuit, coupled between the transmission port and the power bus, and configured to transmit the input power as the charging power to the power bus; and
    a control circuit, coupled to the transmission port to communicate with the external power apparatus, and detecting a battery voltage of the battery module, wherein when the control circuit determines that the external power apparatus is a programmable power supplier and detects that the battery voltage is lower than a reference voltage, the control circuit disables the power conversion circuit and turns on the switching circuit, and the control circuit regulates a set value of the external power apparatus to regulate a voltage value and a current value of the input power dynamically.

2. The electronic apparatus of claim 1, wherein
    when the external power apparatus is not the programmable power supplier or when the battery voltage is higher than or equal to the reference voltage, the control circuit turns off the switching circuit and enables the power conversion circuit, and the control circuit sets the power conversion circuit according to a constant voltage specification value and a constant current specification value of the battery module, so that the power conversion circuit regulates a voltage value and a current value of the charging power accordingly.

3. The electronic apparatus of claim 1, wherein
    when the external power apparatus is the programmable power supplier and the battery voltage is lower than the reference voltage, the control circuit operates in a fast charging mode and regulates the set value of the external power apparatus according to a constant voltage specification value and a constant current specification value of the battery module and a state of the apparatus circuit, so as to dynamically regulate the voltage value and the current value of the input power.

4. The electronic apparatus of claim 3, wherein in the fast charging mode,
    the control circuit sets the voltage value and the current value of the input power as the constant voltage specification value and the constant current specification value, respectively, and
    the control circuit determines whether the state of the apparatus circuit is a power-on state and regulates the voltage value and the current value of the input power accordingly.

5. The electronic apparatus of claim 4, wherein in the fast charging mode,
    if the state of the apparatus circuit is not the power-on state, the control circuit detects whether the battery voltage is lower than the reference voltage; and
    if the battery voltage is lower than the reference voltage, the control circuit continuously operates in the fast charging mode, and the control circuit sets the voltage value and the current value of the input power as the constant voltage specification value and the constant current specification value, respectively.

6. The electronic apparatus of claim 5, wherein in the fast charging mode,
if the battery voltage is greater than or equal to the reference voltage, the control circuit enters a normal charging mode, the control circuit turns off the switching circuit, the control circuit sets the set value of the external power apparatus according to a preset power requirement of the apparatus circuit, and the control circuit enables the power conversion circuit.

7. The electronic apparatus of claim 4, wherein
if the state of the apparatus circuit is the power-on state, the control circuit detects a battery current value of the battery module to determine a state of the battery module, and
if the state of the battery module is a discharge state, the control circuit regulates the set value of the external power apparatus so as to increase at least one of the voltage value and the current value of the input power.

8. The electronic apparatus of claim 7, further comprising:
a current detecting circuit, disposed on a power transmission path among the transmission port, the power conversion circuit, and the switching circuit, configured to detect the current value of the input power, and generating a detecting result to the control circuit accordingly,
wherein when the control circuit determines the current value of the input power is greater than or equal to a threshold value according to the detecting result, the control circuit increases the voltage value of the input power by a preset voltage value, and
wherein when the control circuit determines the current value of the input power is less than the threshold value, the control circuit increases the current value of the input power, wherein an increased amplitude of the current value of the input power is an absolute value of the battery current value.

9. The electronic apparatus of claim 7, wherein
if the state of the battery module is a charging state, and the battery current value is greater than the constant battery specification value, the control circuit sets the voltage value of the input power as the constant voltage specification value and again detects whether the battery current value is still greater than the constant current specification value, and
if the battery current value is still greater than the constant current specification value, the control circuit calculates a current difference between the battery current value and the constant current specification value and decreases the current value of the input power, wherein a decreased amplitude of the current value of the input power is the current difference.

10. A charging method for an electronic apparatus, wherein the charging method comprises:
receiving an input power by a transmission port of the electronic apparatus coupled to an external power apparatus;
determining whether the external power apparatus is a programmable power supplier by a control circuit of the electronic apparatus communicating with the external power apparatus through the transmission port, and detecting and determining whether a battery voltage of a battery module of the electronic apparatus is lower than a reference voltage through the control circuit; and if the external power apparatus is the programmable power supplier and the battery voltage is lower than the reference voltage, the control circuit performing steps of:
disabling a power conversion circuit of the electronic apparatus, and turning on a switching circuit of the electronic apparatus to transmit the input power to the battery module and an apparatus circuit of the electronic apparatus; and
regulating a set value of the external power apparatus to dynamically regulate a voltage value and a current value of the input power, so as to charge the battery module and supply power to the apparatus circuit.

11. The charging method of claim 10, further comprising:
performing following steps by the control circuit if the external power apparatus is not the programmable power supplier or the battery voltage is higher than or equal to the reference voltage:
turning off the switching circuit and enabling the power conversion circuit to convert the input power to a charging power, so as to charge the battery module and supply power to the apparatus circuit; and
setting the power conversion circuit according to a constant voltage specification value and a constant current specification value of the battery module, so as to regulate a voltage value and a current value of the charging power.

12. The charging method of claim 10, wherein the step of regulating the set value of the external power apparatus to dynamically regulate the voltage value and the current value of the input power comprises:
reading a constant voltage specification value and a constant current specification value of the battery module;
regulating the set value of the external power apparatus according to the constant voltage specification value and the constant current specification value of the battery module and a state of the apparatus circuit to dynamically regulate the voltage value and the current value of the input power.

13. The charging method of claim 12, wherein the step of regulating the set value of the external power apparatus according to the constant voltage specification value and the constant current specification value of the battery module and the state of the apparatus circuit to dynamically regulate the voltage value and the current value of the input power comprises:
setting the voltage value and the current value of the input power as the constant voltage specification value and the constant current specification value; and
determining whether the state of the apparatus circuit is a power-on state, and regulating the voltage value and the current value of the input power accordingly.

14. The charging method of claim 13, wherein the step of determining whether the state of the apparatus circuit is the power-on state and regulating the voltage value and the current value of the input power accordingly comprises:
detecting whether the battery voltage is lower than the reference voltage if the state of the apparatus circuit is not the power-on state;
respectively setting the voltage value and the current value of the input power as the constant voltage specification value and the constant current specification value if the battery voltage is lower than the reference voltage; and
turning off the switching circuit and setting the set value of the external power apparatus according to a preset power requirement of the apparatus circuit and enabling the power conversion circuit if the battery voltage is higher than or equal to the reference voltage.

15. The charging method of claim 13, wherein the step of determining whether the state of the apparatus circuit is the power-on state and regulating the voltage value and the current value of the input power accordingly comprises:
   detecting a battery current value of the battery module to determine a state of the battery module if the state of the apparatus circuit is the power-on state; and
   regulating the voltage value and the current value of the input power according to the state of the battery module.

16. The charging method of claim 15, wherein the step of regulating the voltage value and the current value of the input power according to the state of the battery module comprises:
   determining whether the state of the battery module is a discharge state,
   if the state of the battery module is the discharge state, regulating the set value of the external power apparatus, so as to increase at least one of the voltage value and the current value of the input power.

17. The charging method of claim 16, wherein the step of regulating the set value of the external power apparatus to increase at least one of the voltage value and the current value of the input power comprises:
   detecting the current value of the input power through a current detecting circuit of the electronic apparatus;
   comparing the current value of the input power with a threshold value;
   increasing the voltage value of the input power by a preset voltage value if the current value of the input power is greater than or equal to the threshold value; and
   increasing the current value of the input power if the current value of the input power is less than the threshold value, wherein an increased amplitude of the current value of the input power is an absolute value of the battery current value.

18. The charging method of claim 15, wherein the step of regulating the voltage value and the current value of the input power according to the state of the battery module comprises:
   determining whether the state of the battery module is a charging state,
   determining whether to regulate the voltage value or the current value of the input power according to a relation between the battery current value and the constant current specification value if the state of the battery module is the charging state.

19. The charging method of claim 18, wherein the step of determining whether to regulate the voltage value or the current value of the input power according to the relation between the battery current value and the constant current specification value comprises:
   regulating the voltage value of the input power as the constant voltage specification value if the battery current value is greater than the constant current specification value and detecting whether the battery current value is still greater than the constant current specification value again; and
   calculating a current difference between the battery current value and the constant current specification value if the battery current value is again detected as being still greater than the constant current specification value, and decreasing the current value of the input power accordingly, wherein a decreased amplitude of the current value of the input power is the current difference.

* * * * *